United States Patent [19]

Ziegler

[11] Patent Number: 4,612,599
[45] Date of Patent: Sep. 16, 1986

[54] CAPACITIVE PRESSURE SENSOR

[76] Inventor: Karlheinz Ziegler, Alemannenstrasse 1, D-7801 Mengen-Schallstadt, Fed. Rep. of Germany

[21] Appl. No.: 683,268

[22] Filed: Nov. 16, 1984

[30] Foreign Application Priority Data

Mar. 24, 1983 [DE] Fed. Rep. of Germany ....... 3310643

[51] Int. Cl.⁴ ......................... H01G 7/00; H01L 29/84
[52] U.S. Cl. ....................................... 361/283; 73/724
[58] Field of Search .................... 73/718, 724; 361/283

[56] References Cited

U.S. PATENT DOCUMENTS 4,178,621 12/1979 Simonelic et al. ................. 73/718 X
4,295,376 10/1981 Bell ................................... 361/283 X
4,495,820 1/1985 Shimada et al. ....................... 73/724

OTHER PUBLICATIONS

59488 European Patent Application Sep. 1982, Hitachi.
IEEE Publication vol. ED-29 Jan. 1982, No. 1, pp. 48 to 56.

Primary Examiner—Donald A. Griffin
Attorney, Agent, or Firm—Frishauf, Holtz, Goodman & Woodward

[57] ABSTRACT

A pressure sensor comprises a measuring capacitor, of which the measuring electrode (7) is insulatedly applied to a silicon membrane (3) and the counterelectrode (18) is insulatedly applied to a silicon disc (2). The measuring electrode (7) and the counterelectrode (18) are surrounded by shielding electrodes (11, 21). The shielding electrodes (11, 21), as well as the silicon discs (1), are fed with a shielding voltage of which the electrical potential is the same as that of the measurement electrode (7). The two silicon discs (1, 2) are mechanically interconnected by bump connections (25, 29, 31, 32).

10 Claims, 5 Drawing Figures

CAPACITIVE PRESSURE SENSOR

The invention concerns a pressure sensor with a semiconductor membrane covering a measuring capacitor, the membrane being disposed at a spacing from a fixed counterelectrode.

BACKGROUND AND PRIOR ART

Such a pressure sensor is known from EP-A2-0024 945 and serves for observing an absolute or relative pressure, especially in a motor vehicle engine, wherein a changed capacitance is detected by the bending of the semiconductor membrane. The counterelectrode of the known pressure sensor is applied as a conducting layer on an insulating glass substrate. The glass substrate, as a whole, is covered with a doped silicon layer in which apertures have been made by etching. The mid-region of the silicon layer, weakened by etching, operates as flexible membrane, while the unaffected rim of the silicon layer is bonded to the glass substrate. The silicon layer accordingly represents in its entirety one electrode of a measuring capacitor.

The manufacture of the known pressure sensor requires a series of technological steps of the thick film technology kind. For this reason, economical mass production is difficult to obtain. Since the entire silicon layer is constituted as an electrode, reference capacitances must be made available suplementarily outside of the pressure sensor. Finally, the known pressure sensor is unprotected with reference to disturbing voltages.

The invention has the object of providing a pressure sensor of the kind mentioned in the introduction, that can be manufactured with as few steps as possible of the now common and well developed silicon technology, and lends itself to providing reference capacitors and guard voltage electrodes in a simple way.

This object is accomplished in accordance with the invention by a applying a first conducting layer as a measuring electrode on the semiconductor membrane of a first semiconductor plate, being insulated from the latter, and applying a second conducting layer as the counterelectrode on a second semiconductor plate, insulated from the latter.

Since both electrodes have a semiconductor as substrate, similar readily controllable technological process steps are available for the manufacture of the first semiconductor plate carrying the semiconductor membrane and the second semiconductor plate carrying the counterelectrode.

In an advantageous embodiment of the invention, the semiconductor plates are silicon discs on which a silicon oxide layer has been produced by oxidation of the silicon to serve as an insulating layer. It is advantageous for both the measurement electrode and the counterelectrode to be formed as discs and to be surrounded by shield electrodes which are substantially ring-shaped. The shield electrodes can have a shielding voltage applied which has the same potential as the sensitive measurement electrode. In this manner disturbing electrical influences are excluded to a great extent. Particularly simple manufacture results if the silicon discs are electrically and mechanically bonded together by bumping technology.

Annular cavitites can be provided in the shield electrodes in order to provide room for the electrodes of a reference capacitor.

It is advantageous for the shield electrodes to be galvanically connected with the silicon plates, since then the entire silicon plate is effective as a shield electrode.

In an advantageous embodiment of the invention, a cover layer of silicon oxide as deposited by the decomposition of silane vapor is provided as the top layer of the silicon plates which acts as dielectric for the reference capacitance and as a spacer for the measurement capacitance.

Further advantageous embodiments are designated in the dependent claims.

BRIEF DESCRIPTION OF THE DRAWING

An illustrative embodiment of the subject matter of the invention is represented in the drawing, in which.

DESCRIPTION OF THE ILLUSTRATED EMBODIMENT

Figure 1:
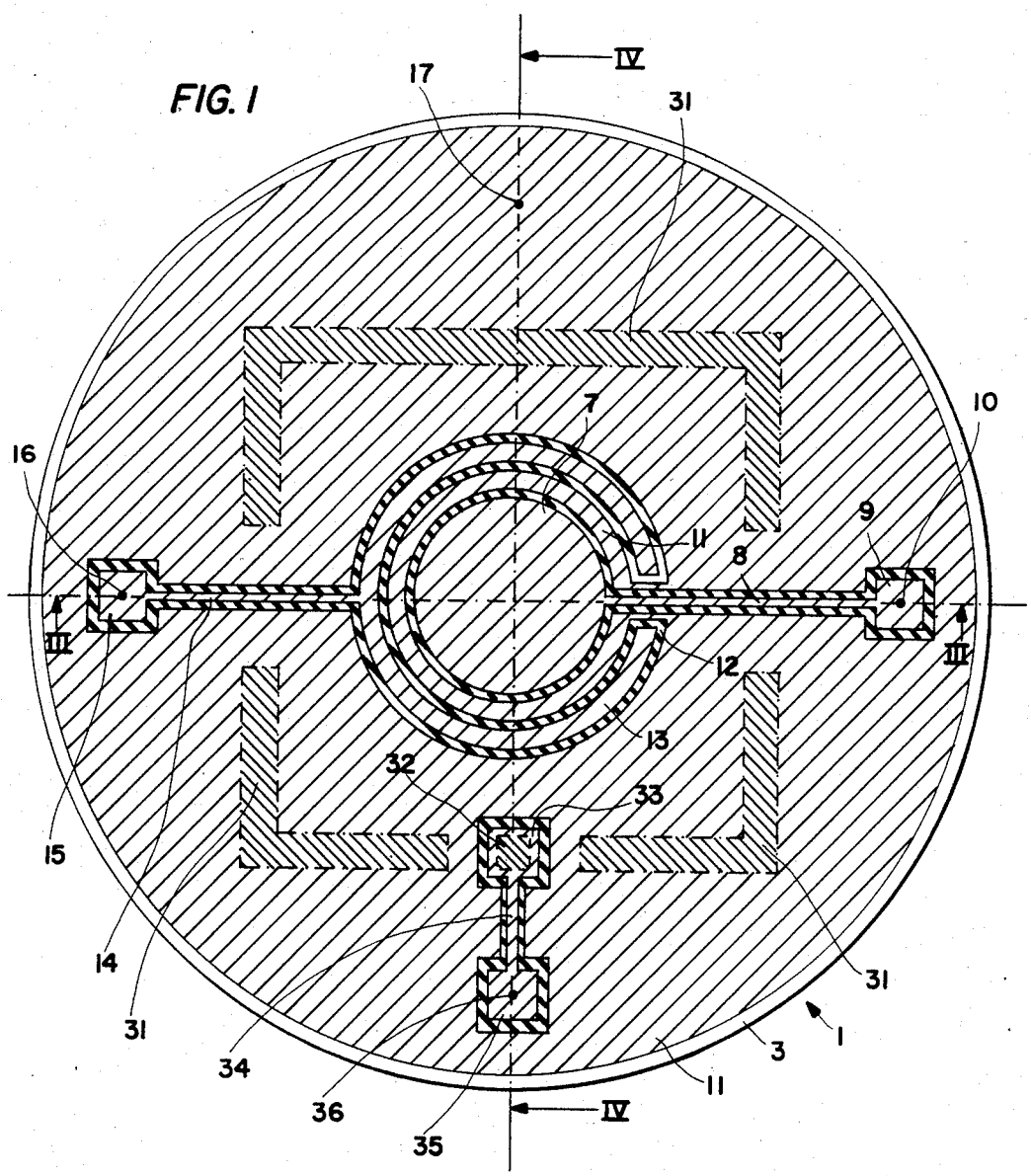
FIG. 1—shows the first of the two silicon discs of the pressure sensor, according to the invention, in a plan view of the side provided with electrodes.

The pressure sensor consists of two silicon discs processed in the usual silicon technology, namely, and upper silicon disc 1 and and lower disc 2. The silicon plates represented in FIGS. 1 and 2, after conclusion of proces steps, described below, of separately completing them, are put in registry with each other in the way recognizable from FIGS. 3 and 4, and then are connected to each other mechanically and electrically by pressing them together.

A membrane 3 is produced in the upper silicon disc 1 by silicon etching, this being shown relatively too small in its radial extent in the drawing. The respective sides of the upper silicon plate 1 and of the membrane 3, which are exposed to the pressure to be measured, are coated with a protective layer 4 as can be recognized in FIGS. 3 and 4.

Figure 3:
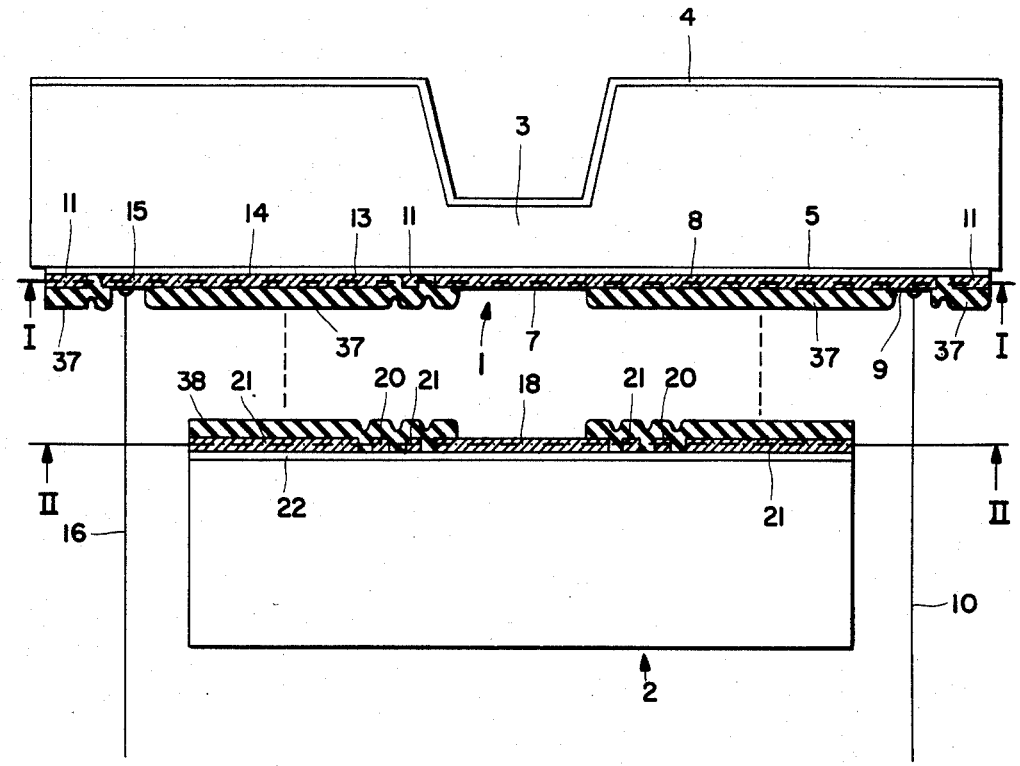
FIG. 3—is a cross section through the silicon discs according to FIGS. 1 and 2 along the line III—III.
Figure 4:
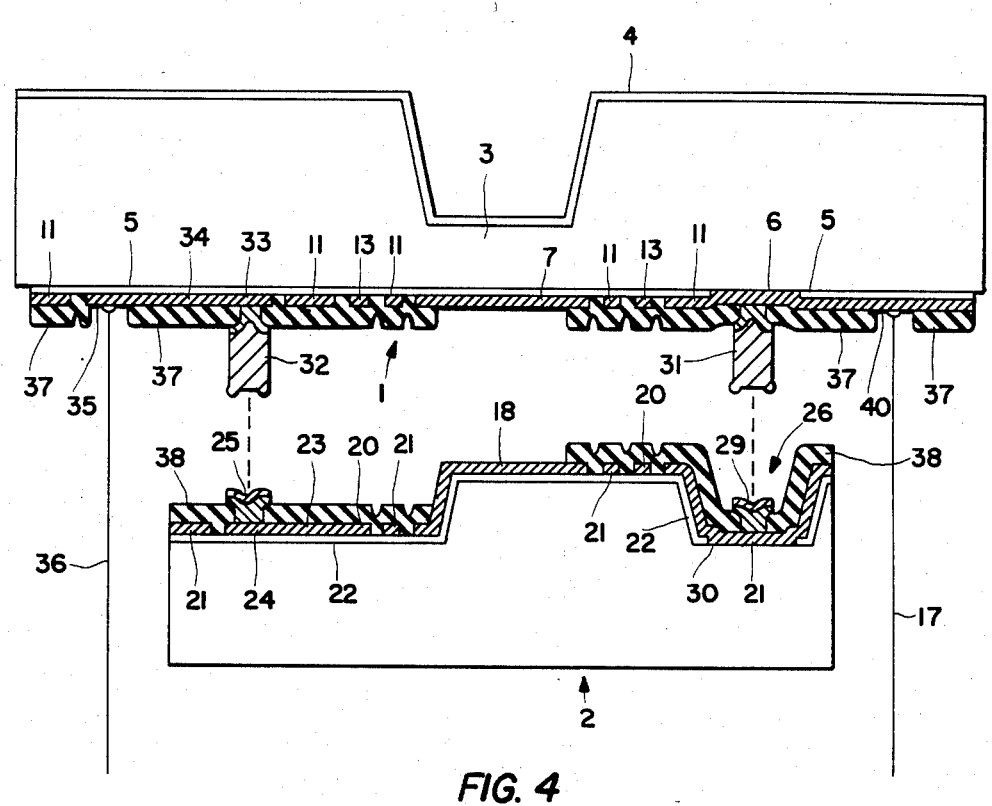
FIG. 4—is a cross section through the silicon discs according to FIGS. 1 and 2 along the lines IV—IV, and FIG. 5—An equivalent network diagram of the sensor according to the invention for making evident the significance of the various electrodes.

On the side of the upper silicon disc 1 facing downward in FIG. 3, a silicon dioxide layer 5, having an oxide window 6 shown in FIG. 4, is applied by oxidation of the silicon of the disc.

A number of electrodes are provided by vapor deposition with aluminum on the silicon dioxide layer 5, followed by masking and immediately thereafter etching with few process steps of the usual silicon technology. A measuring electrode 7 is located beneath the membrane 3 and is connected through a measurement electrode connection stripe 8, in the manner recognizable from FIGS. 1 and 3, with a measurement electrode connection pad 9. The connection pad 9 is electrically connected with a measurement electrode lead 10 by bonding.

The measurement electrode 7 is preferably constituted as a round disc surrounded by an upper shield electrode 11. As can be recognized in FIG. 1, an upper aperture 12 is provided in the shield electrode 11 in which another electrode has remained as reference electrode 13, constituted as an almost closed ring.

The reference electrode 13 is connected over a reference electrode strip 14 with a reference electrode connection pad 15. These lie in correspondingly provided regions of the aperture 12. As can be seen in FIG. 3, the reference electrode connection pad 15 is electrically connected by bonding with a reference lead 16. The reference electrode 13 is surrounded on all sides by the upper shield electrode 11, which shield electrode is connected in the usual way to a guard voltage generator or shield voltage generator through a shield voltage connection 17 shown in FIG. 4 and connected with a shield electrode connection pad 40. Together with an inner counterelectrode 18 illustrated in FIGS. 2-4, the measuring electrode 7 forms a pressure-sensitive measuring capacitor for determining the pressure which bends the membrane 3. The disc-shaped inner counterelectrode 18 is connected over a bridge 19 with a substantially ring-shaped outer counterelectrode 20. As can be seen by a comparison of FIGS. 1 and 2, as well as from FIG. 3, the outer counterelectrode 20 and the reference electrode 13, constitute a reference capacitor, of which the capacitance is determined substatially by the dimensions of the reference electrode 13 and of the outer counterelectrode 20, their spacing from each other and the diaelectric lying between them.

Between the inner counterelectrode 18 and the outer counterelectrode 20, there is, like on the upper silicon disc 1, a ring-shaped section of a lower shield electrode 21. This lower shield electrode 21 is connected with the upper shield electrode 11 electrically by a bump connection which also serves for mechanical connection of the upper silicon disc 1 with the lower silicon disc 2.

Figure 2:
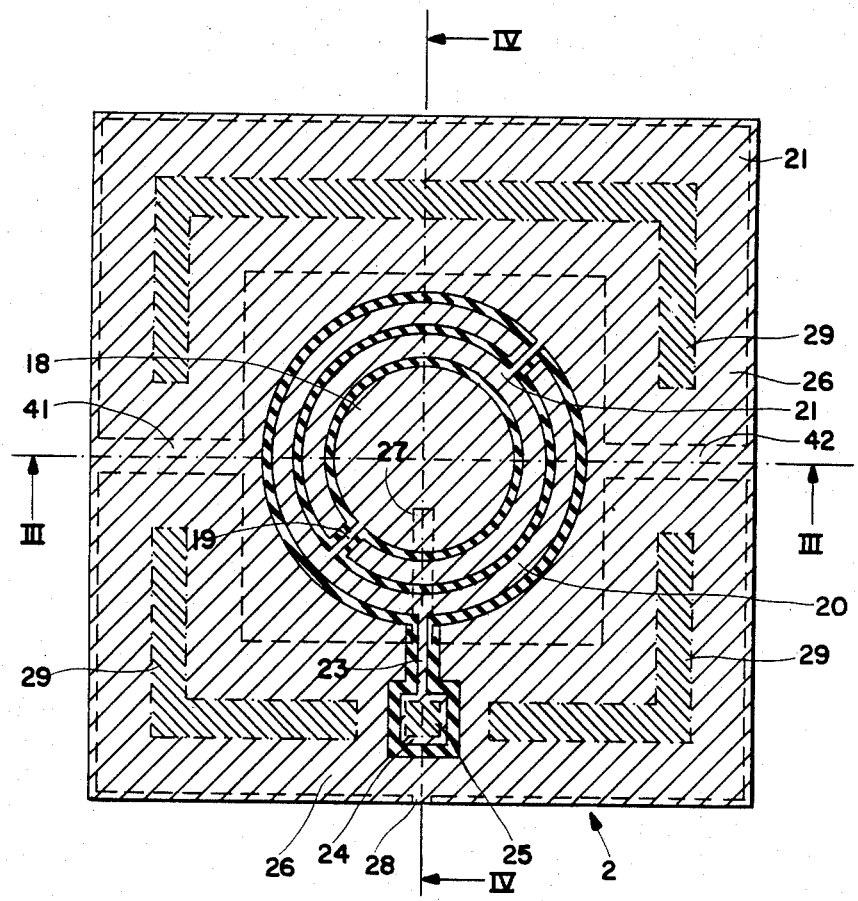
FIG. 2—is a plan view on the side of the lower silicon disc equipped with electrodes.

The inner counterelectrode 18 and the outer counterelecttrode 20 are electrically insulated from the lower silicon disc 2 by means of a silicon dioxide layer 22. The outer counterelectrode 20 is connected with a countrelectrode contact pad 24 by means of a counterelectrode strip 23. The counterelectrode contact pad 24 is coated with a diffusion-limiting metal film, on which a bump contact 25 of gold is placed. The bump contact 25 is located in an etched trough 26 which surrounds the outer counterelectrode 20 and is prolonged over to the inner counterelectrode 18, so that aeration or venting of the measuring capacitor formed between the measuring electrode 7 and the inner counterelectrode 18 can take place over the channel 27. For this purpose, the etched trough 26 is accessible through an opening 28 when the upper silicon disc 1 is bonded to the lower silicon disc 2. Two strips 41 and 42 within the etched trough 26, visible in FIG. 2, are provided for support and shielding of the measuring electrode strip 8 and the reference electrode strip 14 shown in FIG. 3 as well as in FIG. 1.

An oxide window 30 is provided in the silicon dioxide layer 22 in order to allow connection between the lower shield electrode 21 and the lower silicon disc 2. The lower shield electrode 21 is equipped with gold bump-contacts 29 produced with the interposition of a diffusion limiting metal. The bump-contact 29, just like the bump-contact 25, lie recessed in the etched trough 26 of the lower silicon disc 2.

Bump-contact beams 31 of gold are located opposite the contact 29. Opposite the bump-contact 25 is a bump-contact 32 of gold shown in FIG. 2 and FIG. 4 which is connected electrically with a counterelectrode contact pad 33 through a diffusion-limiting metal layer. The counterelectrode contact pad 33 is connected in the manner shown in FIG. 1 by means of a contact strip 34 to a counterelectrode connection lead pad 35 which serves for connection to a counterelectrode lead conductor 36.

In putting together the sensor, the upper silicon disc 1, shown in FIGS. 1 to 4, and the lower silicon disc 2, are first oriented with respect to each other in a configuration evident from FIGS. 3 and 4, by means of registry marks not shown in the drawing and then they are pressed against each other. The bump-contact beam 31 and the bump-contact piece 32 thereby reach into the etched trough 26 and finally touch the corresponding bump-contacts 25 and 29 that may, if desired, be tinned. By application of the usual pressure for producing bump connections, a mechanical connection of the upper silicon disc 1 with the lower silicon disc 2 is produced at the corresponding usual manufacturing temperature, with the result that at the same time an electrical connection is produced between the lower shield electrode 21 and the upper shield electrode 11. Since the latter respectively have contact with the upper silicon disc 1 and the lower silicon disc 2, the bump process also produces an electric connection of the silicon discs 1 and 2.

In order to insulate the electrodes disposed on the upper silicon disc 1, from the electrodes disposed on the lower silicon disc 2, an upper cover layer 37 is provided on the upper silicon disc 1 and the a lower cover layer 38 on the lower silicon disc 2. The cover layers 37 and 38 consist, for example, of silicon oxide deposited in the decomposition of silane vapor and, in addition to their function as insulators, also have the supplementary functions of a spacer and of a dielectric for the reference capacitor. The magnitude of the measurement capacitance and the maximum bending of the membrane 3 up to the point of contact with the inner counterelectrode 18 is determined, furthermore, by the thickness of the cover layers 37 and 38.

In the case of a modified embodiment not shown in the drawing, bumps can also be produced by the bump process at the connection areas, so that the connection leads can be constituted by tape bonding.

In another embodiment not shown in the drawing, the silicon dioxide layers 5 and 22 are replaced by p-n junctions and the conducting paths are replaced by diffusion zones. The production of the cover layers 37 and 38 can then take place partly or entirely by thermal oxidation. The disadvantage of such a design, however, is that no insulation against the silicon substrate remains at temperatures above 120° C. up to 150° C.

In place of aluminum, other metals can also be used, e.g., tungsten and platinum, in which case indium would be used as the connection metal in the bumps.

Polycrystaline silicon can also be used instead of aluminum as electrode material, in which case a part of the polysilicon can be thermally oxidized and the cover layers can be formed partly or completely, which permits a more precise setting of the oxide thickness in case of exclusive use of thermal oxidation. In that way, furthermore, a higher operating temperature is also possible.

For better shielding, especially at higher temperaures, the silicon disc can be coated with polysilicon immediately after silicon etching.

As already mentioned above, in the bumping process, bumps can also be produced at the connection of the connection leads, so that tape bonding can be used for the lead connection.

Both absolute pressure and relative pressure measurements can be carried out with the pressure sensor abovedescribed. Whereas in the case of absolute pressure measurements the opening 28 is sealed shut, it connects with the reference pressure source through a vent channel in the case of relative pressure measurements. In the case of absolute pressure measurements, it is useful to put a glass cap bulb on the rim of the silicon disc 1 and to connect it to the silicon by anodic bonding.

Figure 5:
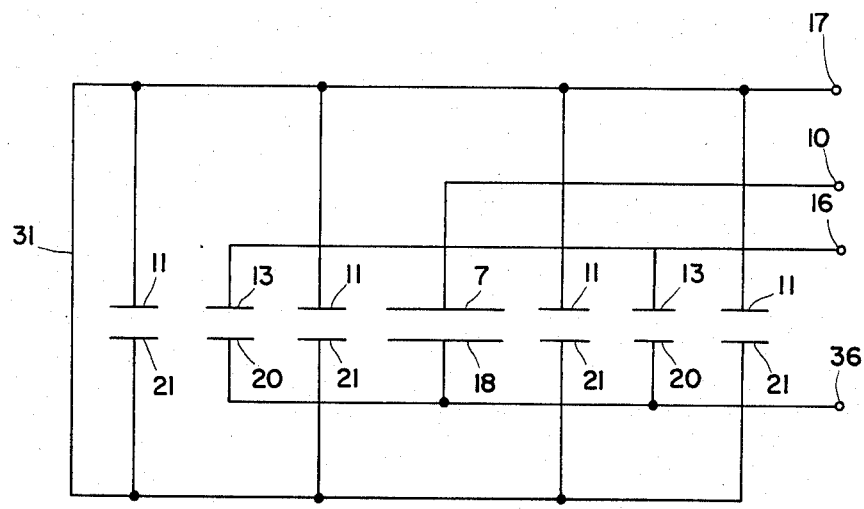

The various electrodes of the pressure sensor are shown in an electric circuit diagram in FIG. 5. The measurement capacitor, composed of the measuring electrodes 7 and the inner counterelectrode 18, is interposed between the measurement electrode lead 10 and the counterelectrode lead 36. These two leads are thence connected, according to the evaluation circuit used, with a bridge circuit, an oscillator circuit or a charge and discharge circuit. The shield signal delivered by a guard voltage generator which has the same potential as that of the measurement electrode 7 or of the counterelectrode 18, is fed in through the shield lead 17. The capacitance of the reference capacitor is available between the reference lead 16 and the counterelectrode lead 36.

I claim:

1. Capacitative pressure sensor of the semiconductor membrane type comprising:
   a first semiconductor plate (1) having a center portion of a reduced thickness constituting a pressure-sensitive membrane for carrying the movable electrode of a measuring capacitor;
   a second semiconductor plate (2) facing at least a portion of said first semiconductor plate which includes said center portion thereof and a portion surroundingly adjacent to said center portion, for carrying a counterelecrode of fixed position for said measuring capacitor;
   a first insulating layer (5) applied to an area of the surface of said first semiconductor plate (1) facing said second semiconductor plate, which area includes the surface of said membrane;
   a second insulating layer (22) applied to an area of the surface of said second semiconductor plate (2) facing said first semiconductor plate, which includes an area opposite said membrane;
   an electrically conducting electrode layer (7) constituting said movable electrode and disposed on the portion of said first insulating layer applied to said membrane and thereby insulated from said first plate;
   an electrically conducting counterelectrode layer (18) constituting said counterelectrode of fixed position and disposed on said second insulating layer (22) opposite said movable electrode and insulated from said second plate (2) by said second insulating layer (22);
   electrically conducting connection paths (21, 29, 31, 6) disposed between said first and second plates while supported on one or the other thereof, at least some of said paths being insulated from the plate on which it is supported by one of said insulating layers,
   said first and second semiconductor plates being connected at least mechanically together in respective portions thereof radially outward of said membrane with respect to an axis passing through the center of said membrane perpendicular thereto by features (25, 29, 31, 32) provided on said plates for maintaining at least a predetermined minimum spacing between said electrodes.

2. Capacitative pressure sensor of the semiconductor membrane type comprising:
   a first silicon disc (1) having a center portion of a reduced thickness constituting a pressure-sensitive membrane for carrying the movable electrode of a measuring capacitor;
   a second silicon disc (2) facing at least a portion of said first silicon disc which includes said center portion thereof and a portion surroundingly adjacent to said center portion, for carrying a counterelectrode of fixed position for said measuring capacitor;
   a first insulating silicon dioxide layer (5) applied to an area of the surface of said first disc facing said second disc which area includes a surface of said membrane;
   a first conducting layer (7) on said first insulating layer in the region of said membrane and insulated from said first disc, for serving as said movable electrode of said measuring capacitor;
   a second insulating silicon dioxide layer (22) applied to an area of the surface of said second silicon disc facing said first disc including the surface area of said second disc opposite said membrane, and
   a second conducting layer (18) on said second insulating layer (22) and insulated thereby from said second disc (2), disposed opposite said first conducting layer for serving at least at least in part as said counterelectrode of said measuring capacitor;
   said first and second silicon discs being connected at least mechanically together in respective portions thereof radially outward of said membrane with respect to an axis passing through the center of said membrane perpendicular thereto in a manner maintaining at least a predetermined minimum spacing between said first and second conducting layers.

3. Pressure sensor according to claim 2, in which said movable electrode constituted by said first conducting layer (7) and said counterelectrode constituted by said second conducting layer (18) are each surrounded in a radial direction with respect to said axis by a shield electrode (11,21) disposed on the respective insulating layer (5,22).

4. Pressure sensor according to claim 3, in which said shield electrodes (11, 21) are each connected ohmically with the respective silicon disc (1,2) through a window (6, 30) of the insulating layer (5,22) on which it is disposed.

5. Pressure sensor according to claim 3, in which said shield electrodes (11, 21) and said silicon discs (1, 2) are electrically and mechanically connected together in the region of their outer edges by bump connections (29, 31).

6. Pressure sensor according to claim 5, in which a contact stripe (34) is provided on said first silicon disc (1) and in which said second conducting layer (18) is connected mechanically and electrically with said contact stripe by a bump connection (25, 32).

7. Pressure sensor according to claim 5, in which said shield electrodes (11, 21) respectively have apertures (12) lying opposite each other within which are respectively provided conducting layers (13, 20) of at least one reference capacitor.

8. Pressure sensor according to claim 7, in which said apertures (12) extend in ring shape within the respective areas occupied by said shield electrode (11, 21) on the respective silicon discs, said at least one reference capacitor (13) having a third conducting layer surrounding said first conducting layer constituting said movable electrode of said measuring capacitor in ring shape, as well as surrounding part of said shield electrode (11) surrounding said first conducting layer and having also a fourth conducting layer (20) connected electrically with said second conducting layer (18) serving as said counter electrode over a connecting bridge (19).

9. Pressure sensor according to claim 5, in which a cover layer (37, 38) is provided on the facing surfaces of both said silicon discs (1, 2), said cover layers having windows respectively in the region of said first conducting layer (7) and in the region of said second conducting layer (18) lying opposite said first conducting layer (7) and also in the respective regions of said bump connections, said silicon discs further having connection pads, said cover layers being further provided with windows in the region of said connecting pads for the attachment of connecting leads.

10. Pressure sensor according to claim 9, in which said cover layers (37, 38) are constituted of silicon oxide in the form in which silicon oxide is deposited by the decomposition of silane vapor.

* * * * *